2,161,170

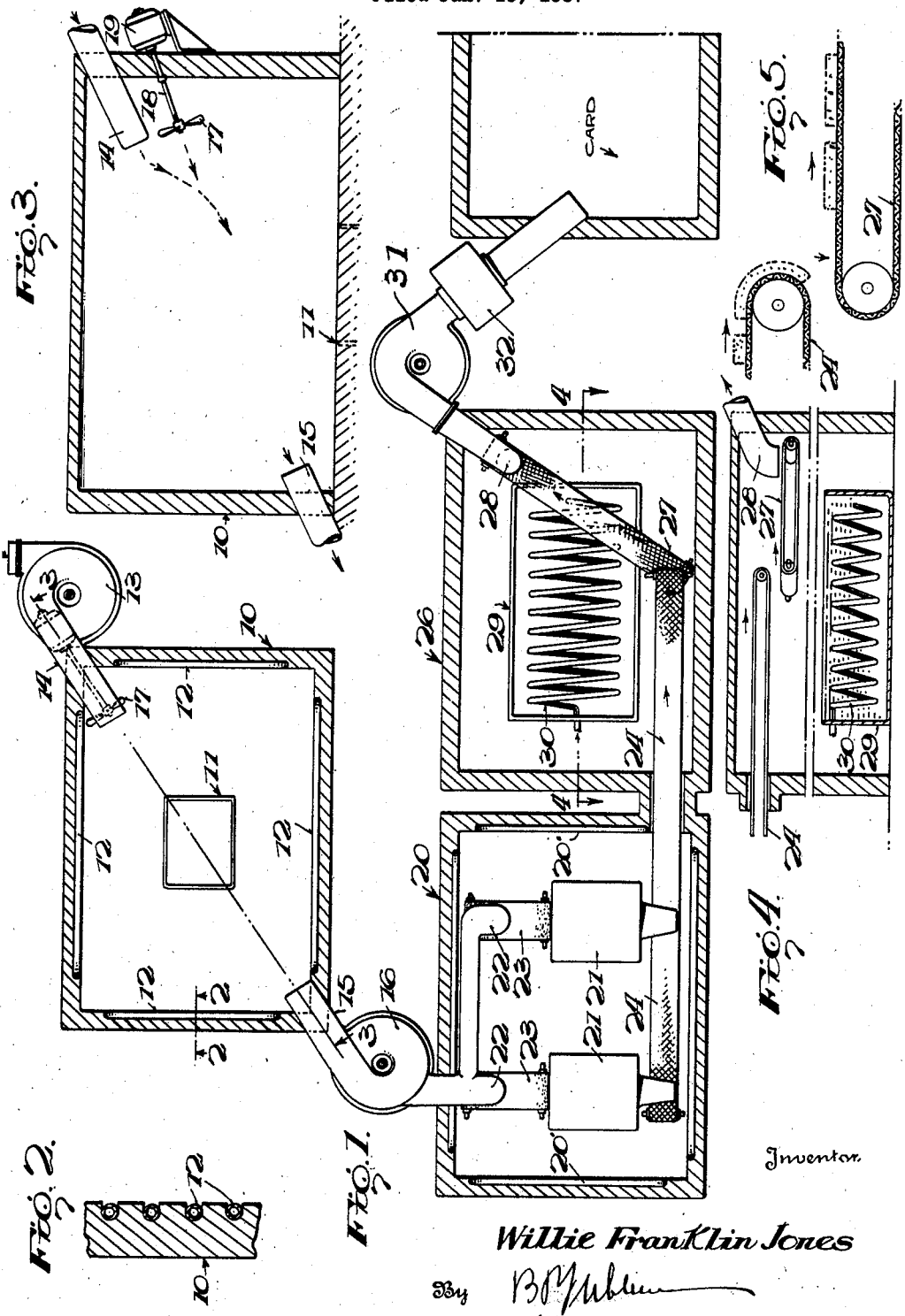
June 6, 1939. W. F. JONES 2,161,170
APPARATUS FOR CONDITIONING COTTON
Filed Jan. 19, 1937
Inventor
Willie Franklin Jones Patented June 6, 1939

UNITED STATES PATENT OFFICE 2,161,170

APPARATUS FOR CONDITIONING COTTON

Willie Franklin Jones, Anderson, S. C.

Application January 19, 1937, Serial No. 121,356

3 Claims. (Cl. 19—66)

My invention relates to apparatus for conditioning cotton so that it will have the desired properties for spinning, weaving or the like.

An important object of the invention is to provide apparatus of the above mentioned character which is adapted to clean the cotton, and manipulate the same so that it is thoroughly acted upon by vapors which will properly condition the cotton for the subsequent operations, such as spinning, weaving or the like.

Other objects and advantages of the invention will be apparent during the course of the following description.

In the accompanying drawing forming a part of this application and in which like numerals are employed to designate like parts throughout the same, Figure 1 is a plan view, largely diagrammatic, of apparatus embodying my invention, Figure 2 is a detailed section taken on line 2—2 of Figure 1, Figure 3 is a vertical section taken on line 3—3 of Figure 1, Figure 4 is a similar view taken on line 4—4 of Figure 1 and, Figure 5 is an edge elevation of the overlapping ends of the conveyors.

In the drawing, wherein for the purpose of illustration is shown a preferred embodiment of my invention, the numeral 10 designates an intake chamber, which is formed air-tight, or substantially so. This chamber is preferably formed of a good heat insulating material, such as brick. In the bottom of this chamber there is a dust pit 11. Arranged in the walls of this chamber are steam heating pipes 12, the inner faces of which are preferably substantially flush with the inner faces of the walls so that the cotton will not tend to adhere or clog upon the same. The steam pipes are supplied with steam to keep the temperature of this intake chamber at about 90° F. to 200° F. The exact temperature will depend largely upon the moisture condition of the atmosphere, to which the bales of cotton have heretofore been subjected. The heat treatment in the intake chamber 10 will be regulated to remove about 20% of the normal moisture from the cotton, although the percent of moisture to be removed may be diminished or increased, depending upon the moisture content of the cotton treated. The cotton after passing through any suitable breaking machine is fed by a blower 13 through a pipe 14. This pipe leads into the chamber 10 at or near its top, and preferably near one corner. There is a cotton outlet pipe 15 which leads into the chamber 10 at or near its bottom and preferably diagonally opposite the inlet pipe 14. A blower 16 is connected in the pipe 15 to withdraw the cotton from the chamber 10 through the pipe 15, as will be explained. A rotary fan 17 is arranged within the chamber 10, in the upper portion thereof, to produce a current of air for acting upon the cotton, agitating the same and blowing it downwardly toward the outlet pipe 15. This fan is mounted upon a shaft 18 and is driven by a motor 19.

The numeral 20 designates a chamber or room within which is arranged any number of mechanical cleaners 21. The pipe 15 leads into the chamber or room 20 and has branches 22, discharging the cotton upon endless conveyors 23, which feeds the same into the mechanical cleaners 21. The cotton after being cleaned within these cleaners discharges upon an endless conveyor or apron 24 which carries the cleaned cotton to the exterior of the room or chamber 20. It is preferred that the temperature of the cotton discharging from the intake chamber 10 and introduced into the cleaning chamber 20 be maintained at substantially the same temperature, and for this purpose the pipe 15 is preferably heat insulated, and the chamber 20 may be artificially heated by steam pipes 20', if desired. If the cotton discharging from the intake chamber 10 discharges at a temperature of 90° F. it should reach the chamber 20 at substantially 90° F. and the temperature of this chamber should be maintained at substantially 90° F. Since the heat treatment in the chamber 10 is from 90° F. to 200° F. the temperature of the chamber 20 should be between 90° F. to 200° F.

The endless conveyor or apron 24 is foraminous and may be in the form of a wire screen. This endless conveyor operates within the upper portion of an air-tight chamber 26, and its upper run travels in the direction of the arrow. Arranged near and beneath the discharge end of the conveyor 24 is a coacting conveyor 27, the upper run of which is traveling in the direction of its arrow. The outlet end of the conveyor 24 and the intake end of the conveyor 27 overlap and when the cotton discharges from the discharge end of the conveyor 24 it is inverted and deposited upon the upper run of the conveyor 27 and fed to the intake end of a pipe 28. The conveyors 24 and 27 are horizontally arranged within the upper portion of the chamber 26 and a tank or vat 29 is provided in the bottom of this chamber, to contain a volatile liquid. Within this tank are steam heating coils 30. The heat from the coils 30 causes the liquid to vaporize and the vapors rise within the chamber 26 and since the conveyors 24 and 27 are foraminous and since the cotton is inverted during its travel, all portions of the cotton are treated by the vapor. The steam coils 30 not only vaporize the liquid but maintain the temperature of the chamber 26 from 210° F. to 250° F.

The cotton thus treated with the vapors discharges into the pipe 28 and is conveyed through the same by a suction blower 31 and this cotton is finally fed to the carding room or the room for treatment in the production of yarn or fabric.

It is desirable that the treated cotton discharge from the pipe 28 at substantially the temperature of the carding room, which would be about 80° F. to 90° F., and for this purpose the pipe 28 is provided with a refrigerating unit 32, of any well-known or preferred type.

The operation of the apparatus is as follows: The bale of cotton is broken by the usual breaking machine and fed into the intake chamber 10, and enters in relatively large wads or masses, at or near the top of the chamber 10. Upon entering this chamber the descending cotton is subjected to the action of heat from 90° F. to 200° F. and also to the blowing action of the air stream from the fan 17. This cotton is therefore dried and aerated and deprived of some of its moisture, such as 20% of its normal moisture. The amount of drying must be varied depending upon the amount of moisture in the cotton fed into the chamber 10, which in turn will be regulated by atmospheric conditions. While in the chamber 10 this cotton is dried as indicated, and agitated and aerated and placed in a condition whereby it may be cleaned, when entering the mechanical cleaning machines, to a better advantage. Some of the nits and dirt is removed in the chamber 10. The temperature of the cotton in the chamber 10 is maintained at substantially the same degree when and after it is fed into the chamber 20. This cotton passes into the mechanical cleaners 21 and is treated in the usual manner for cleaning the cotton. This cleaning is aided by the previous heating and aerating treatment. The cleaned cotton which is now in the nature of a fluffy batting discharges upon the conveyor 24 and is carried thereby into the chamber 26. The conveyor 24 is preferably enclosed so that there will be no perceptible change in the moisture content of the cleaned cotton nor in its temperature before being introduced into the chamber 26. When passing into the chamber 26 the temperature of the cotton is raised to 210° F. to 250° F. and due to the fact that it has been deprived of a portion of its normal moisture, and due to the manner in which the cotton is now manipulated and conveyed in the chamber 26, it is thoroughly acted upon by the vapors in the chamber 26. The vapors in the chamber 26 restore to the cotton the desired quality so that it may be properly spun and woven or the like into cloth. In passing from the chamber 26 the temperature of the cotton is reduced to that of the carding room or the like by the refrigerating unit 32.

While the several chambers are shown as separated, if desired, they may be arranged in the same room, at the same elevation, or at different elevations.

It is to be understood that the form of my invention is to be taken as a preferred example of the same and that various changes in the shape, size, and arrangement of parts, may be resorted to, without departing from the spirit of my invention or the scope of the subjoined claims.

Having thus described my invention, I claim:

1. In apparatus for conditioning cotton, an intake chamber, means to introduce broken cotton into the intake chamber, means to heat the chamber so that the cotton thus introduced is deprived of some of its moisture, a fan to aerate the cotton in the intake chamber, a second chamber, means to convey the cotton from the first chamber to the second chamber without substantially altering the temperature of the cotton, a mechanical cotton cleaner arranged within the second chamber and receiving the cotton from the conveying means, a third chamber, means to convey the cotton from the second chamber and into the third chamber without substantially altering the moisture content of the cotton, means providing a vat in the third chamber, means to heat the liquid held within the vat to vaporize the same and to raise the temperature of the third chamber above that of the second chamber, and means to withdraw the treated cotton from the third chamber.

2. In apparatus for conditioning cotton, an intake chamber, means to introduce broken cotton into the intake chamber near its top, means to heat the cotton within the chamber to remove some of its moisture, means to produce air currents within the chamber to aerate the cotton and blow it toward the bottom of the chamber, means leading into the chamber near its bottom to convey the cotton from the same, a second chamber receiving the cotton from the conveying means, a mechanical cotton cleaner arranged within the second chamber to receive the cotton from the conveying means, a third chamber, conveying means operating within the third chamber and serving to advance the cotton and invert the same during its movement and receiving the cotton from the second chamber, means arranged within the third chamber to hold a liquid to be vaporized, and means to heat and vaporize the liquid.

3. In apparatus for conditioning cotton, an intake chamber, means to introduce broken cotton into the intake chamber, means to heat the chamber so that the cotton introduced therein is deprived of some of its moisture, a second chamber, means to convey the cotton from the first chamber to the second chamber, a mechanical cotton cleaner within the second chamber and receiving the cotton from the conveying means, a third chamber, generally horizontal foraminous endless conveyors operating within the third chamber and having their ends overlapping to invert the cotton and receiving the cotton from the second chamber, a vat arranged within the third chamber beneath the foraminous conveyor, and means to heat the liquid within the vat to cause the same to vaporize.

WILLIE FRANKLIN JONES.